US009544581B2

(12) United States Patent
Simon et al.

(10) Patent No.: US 9,544,581 B2
(45) Date of Patent: Jan. 10, 2017

(54) STEREO-PROJECTION DEVICE, STEREO-PROJECTION SYSTEM AND METHOD FOR PROJECTING STEREOSCOPIC IMAGES

(71) Applicant: INFITEC GMBH, Ulm (DE)

(72) Inventors: Arnold Simon, Neu-Ulm (DE); Johann Krauter, Stuttgart (DE); Simeon Brinkmann, Ulm (DE); Klaus Rohwer, Ulm (DE)

(73) Assignee: Infitec GmbH, Ulm (DE)

( * ) Notice: Subject to any disclaimer, the term of this patent is extended or adjusted under 35 U.S.C. 154(b) by 24 days.

(21) Appl. No.: 14/411,328

(22) PCT Filed: Jul. 2, 2013

(86) PCT No.: PCT/DE2013/100244
§ 371 (c)(1),
(2) Date: Apr. 17, 2015

(87) PCT Pub. No.: WO2014/005578
PCT Pub. Date: Jan. 9, 2014

(65) Prior Publication Data
US 2015/0237340 A1 Aug. 20, 2015

(30) Foreign Application Priority Data
Jul. 2, 2012 (DE) .................. 10 2012 013 028

(51) Int. Cl.
*H04N 13/04* (2006.01)
*H04N 9/31* (2006.01)
*G03B 21/20* (2006.01)

(52) U.S. Cl.
CPC ........ *H04N 13/0459* (2013.01); *G03B 21/206* (2013.01); *G03B 21/208* (2013.01);
(Continued)

(58) Field of Classification Search
CPC ....... G03B 21/56; G03B 21/62; G03B 21/208; G02B 27/22; G02B 27/2207; G02B 27/2214; G02B 27/2228; G02B 27/2242; G02B 27/2264; H04N 9/3105; H04N 9/3152; H04N 9/3167
See application file for complete search history.

(56) References Cited

U.S. PATENT DOCUMENTS 5,737,104 A    4/1998  Lee et al.
6,283,597 B1 * 9/2001  Jorke .................. G02B 27/2207
                                                       348/766
(Continued)

FOREIGN PATENT DOCUMENTS

DE      102 49 815 A1    5/2004
DE      103 59 788 A1    4/2005
WO   WO 2004/038457 A2   5/2004

*Primary Examiner* — Sultan Chowdhury
(74) *Attorney, Agent, or Firm* — Muncy, Geissler, Olds & Lowe, P.C.

(57) ABSTRACT

A stereo-projection device comprises at least one light source, at least one collimator for converting visible light generated by the light source into light with a substantially parallel beam path, and at least one interference filter which is transparent at a given angle of incidence for at least one wavelength interval having an interval width of at most 50 nm and which is designed to cross the light with the substantially parallel beam path.

18 Claims, 11 Drawing Sheets

(52) U.S. Cl.
CPC ......... *H04N 9/3114* (2013.01); *H04N 9/3158* (2013.01); *H04N 13/0438* (2013.01); *H04N 13/0454* (2013.01)

(56) References Cited

U.S. PATENT DOCUMENTS

| | | | |
|---|---|---|---|
| 7,495,831 B2* | 2/2009 | Tokita | G02B 5/3083 |
| | | | 353/20 |
| 2002/0109821 A1* | 8/2002 | Huibers | G02B 26/008 |
| | | | 353/84 |
| 2002/0176054 A1 | 11/2002 | Mihalakis | |
| 2004/0046941 A1 | 3/2004 | Yamamoto | |
| 2004/0070842 A1 | 4/2004 | Bierhuizen | |
| 2005/0219429 A1* | 10/2005 | Huang | G02B 27/1026 |
| | | | 349/5 |
| 2006/0103932 A1* | 5/2006 | Relke | G02B 27/225 |
| | | | 359/462 |
| 2010/0060857 A1* | 3/2010 | Richards | G02B 5/285 |
| | | | 353/7 |
| 2012/0249976 A1* | 10/2012 | Shibasaki | H04N 9/3111 |
| | | | 353/52 |

* cited by examiner

STEREO-PROJECTION DEVICE, STEREO-PROJECTION SYSTEM AND METHOD FOR PROJECTING STEREOSCOPIC IMAGES

This nonprovisional application is a National Stage of International Application No. PCT/DE2013/100244, which was filed on Jul. 2, 2013, and which claims priority to German Patent Application No. 10 2013 013 028.7, which was filed in Germany on Jul. 2, 2012, and which are both herein incorporated by reference.

BACKGROUND OF THE INVENTION

Field of the Invention

The present invention concerns a stereo projection device, a stereo projection system, a use of a stereo projection device, and a method for projecting stereoscopic images.

Description of the Background Art

Known from DE 102 49 815 A1 is a projection device for a stereo projection system having a light source, a color wheel with multiple interference filters, an imaging unit, a set of projection optics, and a controller for synchronizing the imaging unit with the color wheel. The color wheel exhibits one or more triplets of interference filters. In this design, each of the triplets has one interference filter of the colors red, green, blue, wherein the interference filters represent narrow-band filters with a bandwidth below 30 nm, in particular of approximately 20 nm. Also disclosed is a stereo projection system, in particular a virtual reality projection system, having one or more such projection devices. Very high contrast and economical stereo projection is made possible with the stereo projection device and the stereo projection system.

Furthermore, complementary interference filters for stereo projection are known from DE 103 59 788 A1, in which passbands and stop bands are designed to be complementary to one another.

SUMMARY OF THE INVENTION

It is an object of the present invention to create a stereo projection device, a stereo projection system, and a method for projecting stereoscopic images that are distinguished from conventional stereo projection devices and methods by improved projection characteristics. In addition, it is the object of the invention to specify a use of a stereo projection device having expanded application possibilities.

According to the present invention, a stereo projection device has at least one light source, at least one collimator for converting visible light generated by the light source into light with a substantially parallel ray path, and at least one interference filter that is transparent at a given angle of incidence for at least one wavelength interval having an interval width of at most 50 nm and that is designed to intersect the light with the substantially parallel ray path.

In addition, the invention concerns a stereo system having at least one stereo projection device according to the invention and having at least one pair of stereoscopic glasses. In this design, the stereoscopic glasses have one eyeglass lens that allows light from one interference filter for one single stereoscopic image to pass and blocks light from other interference filters of the stereo projection device for the other single stereoscopic image, and wherein the other eyeglass lens of the stereoscopic glasses conversely blocks the light or allows it to pass. In this way, very good stereoscopic reproduction can be ensured.

Furthermore, the invention concerns a use of at least one stereo projection device according to the invention. This device works together with at least one first pair of glasses having two first eyeglass lenses that both allow the light from one interference filter for one single stereoscopic image to pass and block the light from other interference filters of the stereo projection device for a different single stereoscopic image. In addition, at least one additional, second pair of glasses with two second eyeglass lenses that both conversely block the light from the interference filters or allow it to pass can optionally be provided. As a result, the effect of suppression of the undesired single stereoscopic image (for one of the two eyes in each case) is successfully translated into the suppression for both eyes together of an unwanted other image—hereinafter referred to as a sub-image—that represents one of the sub-images jointly projected by the projection device according to the invention. Accordingly, it is now possible by means of the stereo projection device according to the invention to project different images that can be viewed selectively by different users with the aid of the first or second pair of glasses. Although this use foregoes the stereo effect, it does make it possible to selectively provide different 2D image information to different users with the good projection and reproduction performance in accordance with the invention.

In addition, a method according to the following invention for projecting stereoscopic images or 2D images has the following steps: generation of visible light; conversion of the generated light into light having a substantially parallel ray path; and filtering of the light having the substantially parallel ray path by means of at least one interference filter that is transparent at a given angle of incidence for at least one wavelength interval having an interval width of at most 50 nm and that is designed to intersect the light with the substantially parallel ray path.

Because the light incident on the interference filter has a parallel or slightly divergent ray path in accordance with the present invention, the angle of incidence is the same for all light rays incident on the interference filter. Slightly divergent is understood to mean a semi-aperture angle of <23°, in particular <15°. Consequently, the action of the interference filter is also substantially the same for all light rays passing through the interference filter. In contrast to conventional stereo projection devices, in which non-collimated light is incident on interference filters, stereo projection devices according to the invention are free from both a significant broadening of the frequency band for which the interference filter is transparent toward smaller wavelengths, which is caused by light rays with large angles of incidence, and a significant reduction in transmission by the interference filter that is associated therewith. In this way, the projection characteristics for stereo images are improved as compared to prior art stereo projection devices. Here, both the invention and the refinements uniformly exhibit an increase in brightness in 3D image reproduction, specifically in comparison with systems using shutter glasses. Furthermore, the invention, and in particular the refinements thereof, permits better, in particular faster, switching between the left-hand and right-hand single stereoscopic images, providing better channel separation and thus a reduction in crosstalk. This results in significantly improved 3D perception.

The collimator does not necessarily have to be located directly downstream of the lamp, but instead, quite generally any desired number of elements can be arranged between the lamp and the collimator, and even between the collimator and the interference filter, as long as it has only been ensured that the interference filter intersects light with a parallel ray path.

In this context, the method according to the invention can not only be used for stereo imaging but also for enlarging the color space in 2D image reproduction (wide color gamut). Here, it is not the case that only 3 narrow frequency bands are used, as in a single stereoscopic image, but instead all narrow frequency bands are used together for a single 2D image, which is to say the sum of the narrow frequency bands, which is to say typically 6 bands. These bands together span a "hexagonal" color space that is larger than the "triangular" color space of a single stereoscopic image, resulting in an improved wide color gamut.

The collimator could also be a specially shaped reflector of the lamp that differs from the prior art in that it is specifically adapted to the requirements of the interference filter and is used in combination therewith.

The way in which the collimator is implemented is fundamentally immaterial to the invention. Thus, the collimator can have at least one aperture, and/or at least one lens, and/or at least one condenser lens, and/or at least one lens system, and/or at least one frusto-conical light guide, and/or at least one rod-shaped light guide, and/or at least one parabolic light guide, and/or at least one set of holographic optics, and/or at least one reflector. For example, the collimator can have a combination of a condenser lens and light guide, wherein the condenser lens can be arranged downstream of the light guide or, conversely, the light guide can be arranged downstream of the condenser lens. If the collimator comprises a light guide, the latter preferably has an exit face in the shape of a rectangle, circle, or circular segment. It is very especially preferred for the collimator to have at least one optical element for narrowing a light cone. With a collimator of this nature, a light beam of an initially broad, large-area light cone with a large aperture angle can be narrowed into a comparatively tight, small-area light cone with a comparatively small aperture angle before passage through the aperture thanks to the optical element. With a suitably chosen aperture, edge regions of the narrowed light cone with light rays that have a relatively large angle of incidence can be masked. Not only is improved collimation of the light rays passing through the aperture achieved in this way, but in addition, the narrowing of the light cone achieved prior to passage through the aperture causes fewer light rays to be masked, making it possible for light to pass through the aperture with higher intensity.

In addition, an aperture can also be used to limit the illuminated area of an interference filter wheel and thus increase the "duty cycle" of the filter wheel.

In the stereo projection device according to the invention, the interference filter can be part of a rotatably mounted wheel, or the interference filter can be arranged so as to be stationary, or the interference filter can be electrically switchable. Ordinarily, rotatably mounted wheels with interference filters are used in stereo projection devices with one projector that projects two single stereoscopic images required for producing a stereoscopic image, while fixed interference filters are used in stereo projection devices that have two separate projectors, each of which projects one of these two single stereoscopic images, or that exhibit a single projector internally having two units each with its own imaging system and associated, separate fixed interference filter, each of which units projects one of these two single stereoscopic images. If the interference filter is part of a rotatably mounted wheel, for example, and covers a circular segment of the wheel in this design, then simple rotation of the wheel can bring the interference filter into the ray path of the light with the substantially parallel ray path so that the filter intersects this light after introduction into its ray path and can also remove it from the ray path of this light if it is intersecting this light within its ray path.

Very generally, wheels that include filter segments and whose filter segments are transparent for particular colors of visible light are referred to as color wheels. It is immaterial here whether or not these filter segments are interference filters. Thus, the wheel in the stereo projection device can itself be a color wheel, for example, or else the stereo projection device can have a color wheel in addition to the wheel.

If the wheel is a color wheel, the interference filter is preferably part of a triplet of three interference filters, each of which is transparent for a predefined frequency band of visible light, wherein the frequency bands do not overlap and the triplet has an interference filter for each of the colors red, green, and blue. In addition to this triplet, additional filters can be provided for primary or secondary colors, in particular for narrow frequency bands. In addition to this first triplet, the stereo projection device has a second triplet of three interference filters that are likewise transparent for particular, predefined, non-overlapping frequency bands of visible light. Like the first triplet, the second triplet also has an interference filter for each of the colors red, green, and blue, but the passbands and stop bands of the interference filters of these two triplets are defined to be complementary to one another. This complementary property is also called orthogonal, and sometimes also disjoint. In practice, it will not always be possible to design the filter characteristics to be orthogonal to one another such that zero overlap is achieved. Therefore, the concept of orthogonal, disjoint, or complementary must be construed in a functionally oriented manner with regard to the goal of good, channel-selective perception of the single stereoscopic images that is to be achieved. A certain residual overlap is acceptable insofar as good channel-selective perception of the single stereoscopic images is achieved; in this case, orthogonality is present. The interference filters of each of the triplets in stereo projection devices of this type are associated with a particular eye of a viewer of stereo images generated by means of the stereo projection device. In this context, a particular color wheel can be provided for each of the triplets, wherein the interference filters of a particular triplet are arranged in sequence in the circumferential direction on a particular one of the wheels, or else the interference filters of both triplet are arranged in sequence in the circumferential direction on one and the same color wheel, wherein interference filters of the particular triplets can either be combined into respective interference filter groups, or can be arranged intermittently, or can have any other desired sequence.

Instead of triplets, multiplets are also possible. In addition, in place of interference filters with individual filters for one narrow passband each to create a narrow frequency band, interference filters with multiple, in particular three, passbands for creating multiple narrow frequency bands are advantageous as well since this reduces the number of individual interference filters, in particular on one color wheel, thus reducing the complexity of the stereo projection device.

In other embodiments of the present invention, the stereo projection device includes a wheel with at least two interference filters that are transparent at a given angle of incidence of visible light for respective disjoint wavelength intervals having an interval width of at most 50 nm. Each of the interference filters in this design covers a particular portion of the wheel. Stereo projection devices of this type have a color wheel with multiple color filter segments in addition to the wheel with the interference filters, wherein at least one of the color filter segments is transparent for red light, and at least one of the color filter segments is transparent for blue light, and at least one of the color filter segments is transparent for green light. However, in contrast to the interference filters of the wheel, the transparency of the color filter segments of the color wheel is not limited to narrow frequency bands. By suitable rotation of both the wheel and the color wheel, different combinations of interference filters and color filter segments can now be placed in the ray path of the light with a substantially parallel ray path, so that both the relevant interference filter that is located in this ray path and the relevant color filter segment that is simultaneously located in this ray path intersect the ray path, and their effects on the light are additive. It is immaterial here whether the color wheel is located upstream or downstream of the wheel in the ray path as long as it has only been ensured that parallel light converted by the collimator is incident on the wheel and in particular on the interference filter. Hence, the color wheel can be located upstream or downstream in the ray path from the combination of the collimator and the wheel. In particular, the color wheel can also be located between the collimator and the wheel. In such embodiments having a small number of interference filters, the wheel can be made comparatively small so that small quantities of costly interference filter are required.

In another embodiment of the present invention, at least one color wheel exhibits an additional filter that, like the others, is arranged on the wheel in an annular fashion. This filter has a markedly small attenuation, which is to say that transmission is high over a wide frequency range. This filter represents a practically achromatic, and thus white, filter. By means of this transparent filter it is possible for the stereo projection device to be operated in a 2D mode, as the interference filters used for the 3D mode are not used in this operating mode and they are not located in the ray path. As a result of this preferred embodiment, switchover from 3D mode to 2D mode and vice versa is possible in a very simple, compact, and robust manner; it is therefore unnecessary to move the wheel with the interference filters out of the ray path, resulting in a simpler construction of the projector.

In this context, it has proven especially successful to select the spatial extent of the transparent filter such that the light beam provided for projection completely passes through the transparent filter, which is preferably stationary. A very efficient 2D mode is created in this way.

Preferably, the stereo projection device is equipped with a synchronization unit for synchronizing the color wheel motion that holds the color wheel in a position with a transparent, achromatic filter in the ray path. The wheel remains in this state as long as the 2D mode is desired as an alternative to the 3D mode (stereo operating mode).

Synchronous illumination of the rotating wheel during periods of time when the transparent filter is located in the ray path is also possible as an alternative to the stationary color wheel. This mode ensures still simpler construction of the synchronization unit at reduced image brightness.

It has also proven successful to select the synchronization of the wheel in such a manner that a switch between the left and right stereoscopic images is implemented synchronously with a point in time when the blue filter of the color wheel is located in the ray path. This choice of synchronization succeeds in shortening the switchover time between the left and right stereoscopic images without relevant impairment of the brightness being present. This is achieved because of the increased transmission of the blue spectral region of the interference filter or the blue filter as compared to other wavelengths.

It has also been shown that the human eye is more error-tolerant for a transition in the region of the blue filter than for other color filter regions.

Another alternative color wheel exhibits, in addition to the at least one transparent achromatic filter (21), at least one, in particular two, filters for a secondary color, in particular for yellow or cyan. The provision of the filter for a secondary color, which relates to a wideband superposition of different primary colors, succeeds in increasing image brightness in 2D operation as compared to the use of a three-color red/green/blue color wheel. In combination with an interference filter wheel, this relative increase in brightness can be maintained, especially when the switchover between the left and right images does not take place between these segments. Any other optical means desired can be arranged in the ray path of the light following the interference filter. Hence, with a stereo projection device according to the invention, in particular at least one lens and/or at least one aperture and/or at least one frusto-conical light guide and/or at least one rod-shaped light guide and/or at least one parabolic light guide can be arranged in a ray path of light emerging from the interference filter.

An especially preferred stereo projection device according to the invention exhibits two frusto-conical light guides as collimator. Of these light guides, one is arranged ahead of the color wheel in the ray direction, in particular the color wheel with the interference filters, and one is arranged behind it. The truncated cones here are arranged such that the truncated cone diameters decrease with increasing distance from the color wheel.

The first frusto-conical light guide ahead of the color wheel ensures that light rays with large angles of incidence are reflected at least once, thereby favorably influencing the angular distribution of the light when it exits in the direction of the color wheel and its interference filters as a result of the enlarged exit face. The second frusto-conical light guide collects the light that has exited the first frusto-conical light guide and passed through the color wheel, and then advantageously homogenizes it for the stereo projection device according to the invention.

Preferably, the truncated cone is chosen with a circular cross-section, since the light source, and thus typically also the light beam provided for projection, is rotationally symmetric, thereby creating an especially efficient, low-loss arrangement.

As an alternative thereto, it has also proven successful to implement the truncated cones as truncated pyramids with a rectangular cross-section, which in particular exhibit an aperture angle of approximately 10 degrees. This embodiment has proven especially successful with flat, array-format light sources, e.g. with square LED arrays.

It has proven especially advantageous to select the light exit face of the frusto-conical light guide ahead of the color wheel in the ray direction to be smaller than the incident light face of the frusto-conical light guide behind the color wheel in the ray direction.

This ensures to a particularly great extent that the light loss upon entry to the second frusto-conical light guide, and thus the light loss of the collimator consisting of the two frusto-conical light guides, is especially low.

Preferably, the exit face of the second frusto-conical light guide is chosen such that it corresponds to an arrangement with a single, in particular cylindrical, light guide as collimator. The same preferably applies to the incident face of the first frusto-conical light guide. In this way the other components of the stereo projection device according to the invention can remain the same. Adaptation is not necessary, or is necessary only to a small extent.

In general, the light source can be any desired light source. However, a stereo projection device is preferred in which the light source has at least one xenon lamp, and/or wherein the light source has at least one halogen lamp, and/or wherein the light source has at least one UHP lamp, and/or wherein the light source has at least one mercury arc lamp, and/or wherein the light source has at least one light-converting material, and/or wherein the light source has at least two individual lamps. In general, extremely bright, nearly point-source light sources with a continuous or quasi-continuous spectrum are advantageous here.

In addition to a light source, stereo projection devices generally include at least one imaging system for generating images and/or at least one set of projection optics for projecting the images and/or at least one projection area on which the images are projected. Hence, a stereo projection device according to the invention is preferred that has at least one imaging system, wherein the interference filter is arranged in the ray path of the light between the light source and the imaging system, or that has at least one imaging system and one set of projection optics, wherein the interference filter is arranged in the ray path of the light between the imaging system and the projection optics, or that has at least one set of projection optics and a projection area, wherein the interference filter is arranged in the ray path of the light between the projection optics and the projection area. At least one single-chip DLP (digital light processing) imaging system, or at least one two-chip DLP imaging system, or at least one three-chip DLP imaging system, or at least one six-chip DLP imaging system, or at least one single-chip LCOS (liquid crystal on silicon) imaging system, or at least one two-chip LCOS imaging system, or at least one three-chip LCOS imaging system, or at least one six-chip LCOS imaging system, or at least one single-chip LCD (liquid crystal display) imaging system, or at least one two-chip LCD imaging system, or at least one three-chip LCD imaging system, or at least one six-chip LCD imaging system, can be used for image generation.

Preferably, the interference filter is transparent at a given angle of incidence for at least one wavelength interval having an interval width of at most 40 nm, or at most 30 nm, or at most 20 nm, or at most 10 nm. In this regard, the interference filter is especially preferably transparent at a given angle of incidence for at least one wavelength interval having an interval width of at most 30 nm, and very especially preferably for at least one wavelength interval having an interval width of at most 20 nm. If stereo projection devices have two or more interference filters, two or more or all of these interference filters can be transparent for the same wavelength range, or each of the interference filters can be transparent for a different wavelength range.

The invention is explained in detail below by means of preferred exemplary embodiments with reference to figures. The invention is not limited to these examples. The drawings show:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
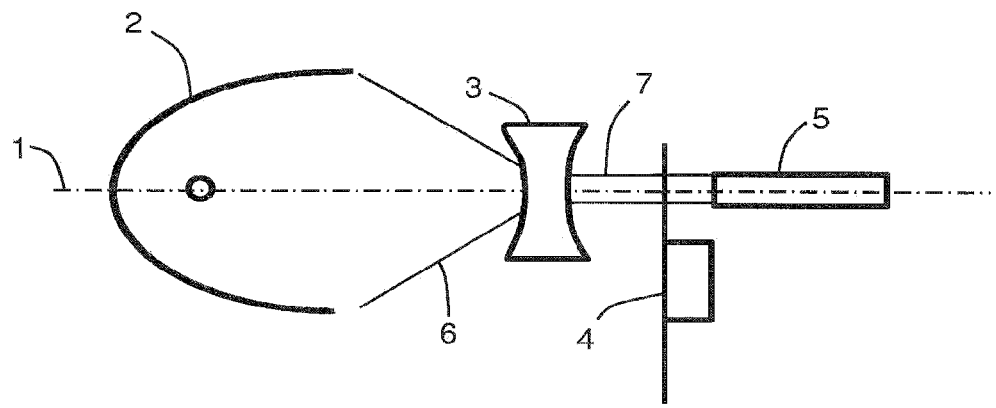
FIG. 1 is a schematic representation of a portion of a stereo projection device.

In FIG. 1, a portion of a stereo projection device according to the invention is shown in a simplified schematic representation for reasons of better understanding. Arranged along a dashed-and-dotted optical axis 1 are a lamp 2 provided as a light source with a parabolic reflector, a lens 3 provided as collimator that has a negative focal length, a rotatably mounted wheel 4 carrying six interference filters, and a rod-shaped light guide 5 that substantially serves to homogenize the ray profile. The axis of rotation of the wheel 4 is oriented parallel to the optical axis 1 so that the wheel 4 is essentially perpendicular to the plane of the drawing and is visible only from the side. In addition, the axis of rotation of the wheel 4 is spaced apart from the optical axis 1, but still close enough to the optical axis 1 that the circular face of the wheel 4, which is perpendicular to the plane of the drawing, crosses or intersects the optical axis 1. All six interference filters are implemented as circular segments and are arranged such that they cover the circular surface on the wheel 4. Each set of three of these interference filters forms a triplet that has one interference filter for each of the colors red, green, and blue. In this design, each one of these six interference filters is transparent for a wavelength band of at most 30 nm in width, but without overlap of the individual wavelength bands. Instead, the passbands and stop bands of the interference filters of these two triplets in combination with the viewers' eyeglasses are made substantially complementary to one another.

During operation of the stereo projection device, visible light 6 is first produced by the lamp 2 and radiated to the lens 3, which has a negative focal length. The light 6 produced by the lamp 2 is converted by the lens 3 into a light beam 7 with parallel or slightly divergent rays. This light beam 7 with a parallel ray path is incident on the wheel 4 or on the interference filter located on the wheel 4 that is presently intersecting the ray path of the light beam 7. This interference filter transmits only light for which the interference filter is transparent. On account of the nearly parallel ray path of the light beam 7, the wavelength band of the light exiting the interference filter is not broadened, nor is the transmissivity of the interference filter significantly reduced, since all rays of the light beam 7 travel an equally long path through the interference filter. The light passing through the interference filter is then incident on the rod-shaped light guide 5 and is guided by it to an imaging system that is not shown, whence it is ultimately projected by a set of projection optics onto a projection area that is likewise not shown in FIG. 1. Since the wheel 4 is driven by a motor that is not shown in FIG. 1, the interference filter that intersects the parallel ray path of the light beam 7 can be replaced in the ray path of the light beam 7 by another interference filter provided on the wheel 4 by simple rotation of the wheel 4. Single stereoscopic images for the left and right eyes of a viewer that are required for stereo projection can be produced by the means that one now causes the interference filters of the two triplets to intersect the parallel ray path of the light beam 7 in a suitable sequence. Although this embodiment exhibits a somewhat increased overall length as compared to other embodiments that do not have the lens 3, which has a negative focal length, it proves to be structurally simple and robust as well as economical.

Figure 2:
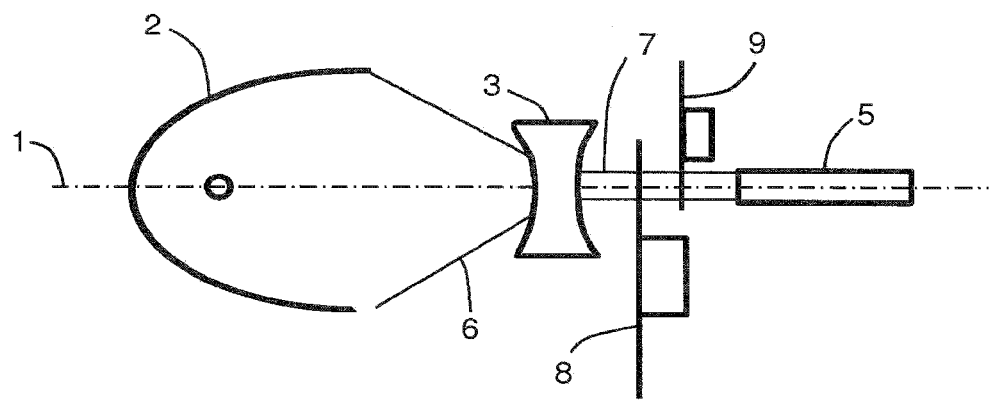
FIG. 2 is a schematic representation of a portion of a stereo projection device with a color wheel.

FIG. 2 shows a schematic representation of a portion of a different stereo projection device according to the invention. In a manner similar to the portion shown in FIG. 1 of the above-described stereo projection device, this portion also includes a lamp 2, a lens 3 provided as collimator, and a rod-shaped light guide 5, all of which are arranged along an optical axis 1 and are labeled with the same reference symbols as the corresponding elements in FIG. 1. In place of the wheel 4 with six interference filters, however, a wheel 8 and also a color wheel 9 are now arranged to intersect the light beam 7 with parallel ray path.

Figure 3A:
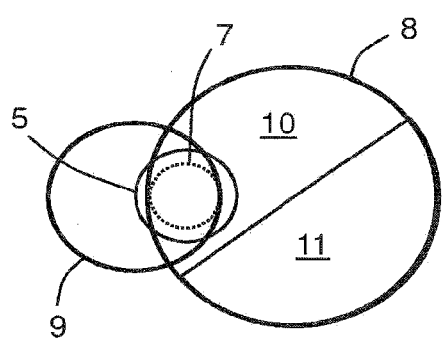
FIGS. 3a-3f illustrate light guides, wheels, and color wheels from a perspective along the optical axis.

In FIG. 3a, the light guide 5, the wheel 8, the light beam 7, and the color wheel 9 can be seen from a perspective along the optical axis 1. Since the light guide 5 and the light beam 7, shown as a dotted circle, are concentric, the optical axis 1 in FIG. 3 runs perpendicular to the plane of the drawing through the center point of the light beam 7 and of the light guide 5. Both the wheel 8 and the color wheel 9, both of which lie in the plane of the drawing in FIG. 3, intersect the light beam 7. Unlike the above-described wheel 4, the wheel 8 in FIGS. 2 and 3a has only two interference filters, namely a first semicircular interference filter 10 and a second semicircular interference filter 11, which cover the circular face of the wheel 8. The passbands of the two interference filters 10 and 11 are narrow, each smaller than 30 nm, and are disjoint. In contrast, the color wheel 9 is provided with at least three or more color filters and/or a white segment, also called an achromatic filter, which are not shown in FIG. 3a for reasons of clarity, and of which at least one is a red filter, one a blue filter, and one a green filter.

While the functions of the lamp 2, lens 3, and light guide 5 in the exemplary embodiment shown in FIGS. 2 and 3a is analogous to the exemplary embodiment shown in FIG. 1, the generation of the single stereoscopic images required for stereo projection takes place here through the interaction of the filtering effects of the interference filters 10 and 11 of the wheel 8, each of which intersects the light beam 7, and the particular color filter of the color wheel 9 that intersects the light beam 7 at the same time. In this process, the relevant color filter determines the basic color red, blue, or green of the light entering the light guide 5, and the relevant interference filter 10 or 11 determines the relevant wavelength range of this light, wherein two disjoint wavelength ranges can be produced for each of the three colors.

Figure 3B:
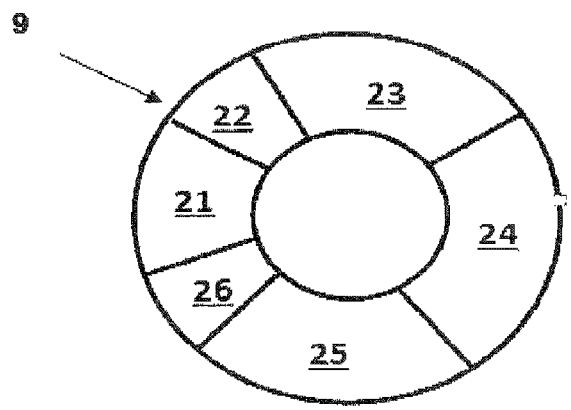
Figure 3C:
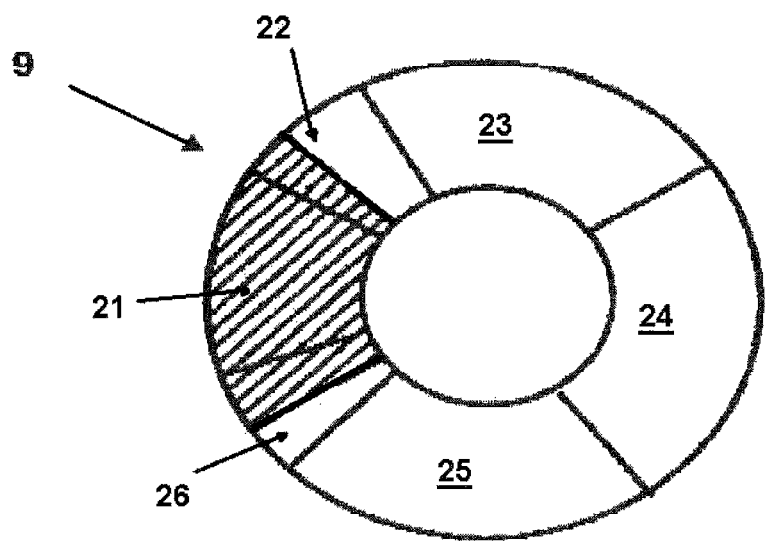
Figure 3D:
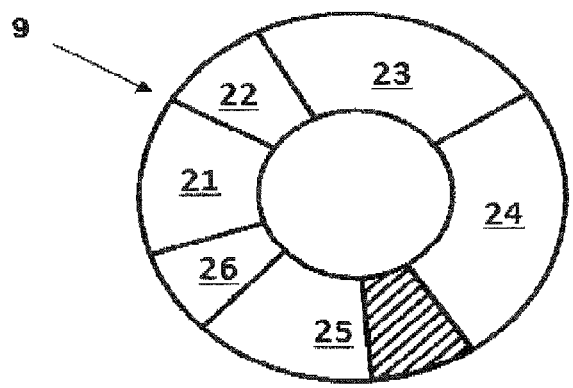
Figure 3E:
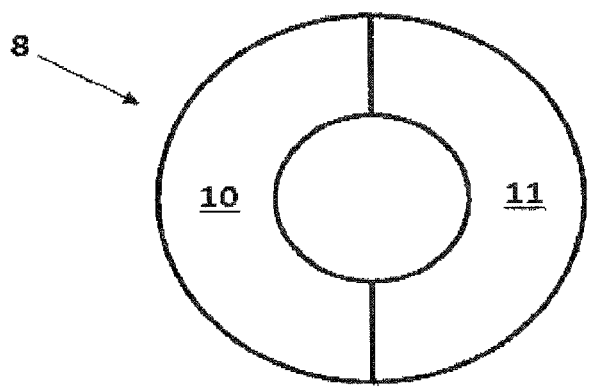

As an alternative to the wheel 8 with two semicircular interference filters as shown in FIG. 3a), it has proven advantageous to implement each of the two interference filters 10, 11 in the shape of a half ring, as is shown in FIG. 3e). In this way the areas of the color wheel 8 implemented with the interference filters 10, 11 are reduced, thereby reducing both the cost and the weight of the rotating color wheel.

Figure 3F:
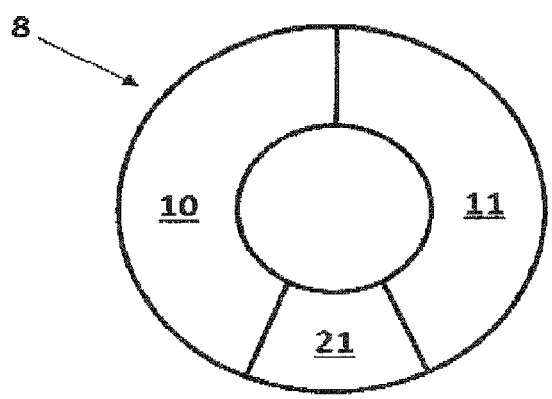

Furthermore, it is advantageous to provide, as shown in FIG. 3f), an additional filter 21 that is distinguished by its high transparency and its achromatic filter characteristics. Filters 21 of this type are also called white filters. This achromatic filter 21, together with the interference filters 10 and 11, represents a complete ring of filters 10, 11, 21 of the color wheel 8 with interference filters. The filter 21 covers a significantly smaller angular range than the interference filters 10, 11. It is in the vicinity of approximately 30 degrees. With the aid of this achromatic filter 21 and an associated controller with the aid of a synchronization unit that is not shown, the filter wheel 8 can be brought to a halt in the ray path of the stereo projection device according to the invention in such a manner that light passes through the color wheel 8 largely unhindered. The especially advantageous additional use of the stereo projection device according to the invention in a 2D mode, which is to say in the manner of a conventional projection device with no 3D functionality (stereo functionality), is produced by means of interaction with the second color wheel 9. The preferred selection of the filter characteristics of the filter 21 makes possible an additional, high-intensity operating mode, the 2D mode.

FIG. 3b) shows an embodiment of the color wheel 4, 9. It shows filters for the primary color red 23, for the primary color green 24, and for the primary color blue 25. These are arranged adjacent to one another in the ring. The filter 21 represents a transparent, achromatic filter that is surrounded by the two filters for the secondary colors yellow 22 and cyan 26. Together, all six filters form a common, closed ring of filters.

FIG. 3c) shows the color wheel 4 from FIG. 3b), wherein one region is shown with hatching. This region is used with the aid of the synchronization unit such that switching between the left and right, single stereoscopic images takes place when the region of the color wheel 4 is oriented in the ray path. In this way, a very reliable switchover and a color perception that suffers little degradation in the 3D mode are produced.

Alternatively, it has proven very successful to choose for the switchover region between the left and right single stereoscopic images to be in the region of the blue filter 25, as is shown in FIG. 3d). Although this requires a very short switchover time, and hence faster stereo projection components, the reproduction result proves to be especially pleasant and not very susceptible to trouble. This results in particular from the fact that errors due to non-synchronous timing of the synchronization unit during switchover in the "blue" are only weakly perceptible, since blue as a color contributes only a small portion to the brightness content in the image.

Figure 4A:
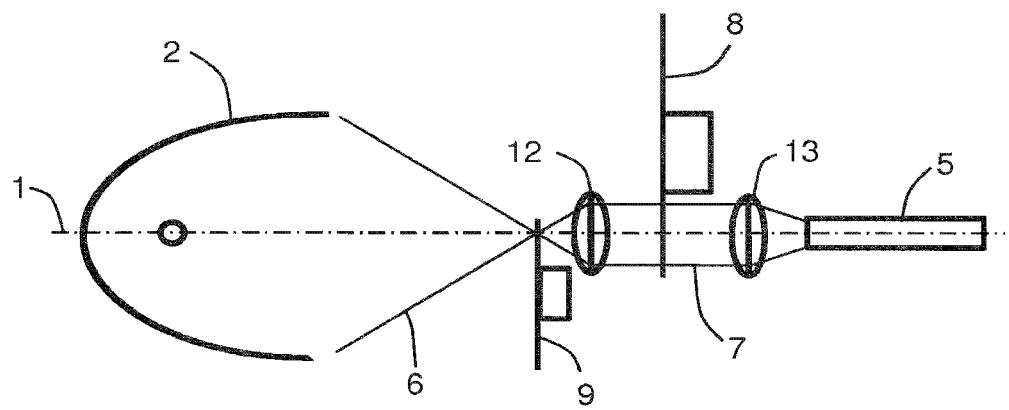
FIGS. 4a-4d illustrate various embodiments with wheel and color wheel.

In the following, different configurations of parts of stereo projection devices according to the invention are shown in FIGS. 4a)-d). All of these configurations have, as in the examples described above, a lamp 2 and a light guide 5 that are arranged along an optical axis 1. Moreover, all of these embodiments have a wheel 8 and a color wheel 9 such as are described in connection with FIGS. 2 and 3.

In the embodiment shown in FIG. 4*a*), the color wheel 9 is located directly downstream of the lamp 2. This is followed by a lens 12, the wheel 8 with the interference filters 10 and 11, a lens 13, and, downstream thereof, the light guide 5. Accordingly, the light 6 generated by the lamp 2 first passes through the color wheel 9, by which one of the three colors red, green, or blue is filtered out of the light 6 before the light is parallelized by the lens 12, which acts as a collimator, and becomes the light beam 7 with a nearly parallel ray path. As already described, this light beam 7 passes through the wheel 8, which filters out light in one or more wavelength intervals of 30 nm that is subsequently focused by the lens 13 onto one end of the light guide 5, by which means it enters the light guide 5 and is guided further thereby.

In place of the color wheel shown in FIG. 4*a*, a wheel with light-converting properties, in particular a so-called phosphor wheel, can also be used. In this case, the ray path of the excitation light need not correspond to the path shown in the figure.

Figure 4B:
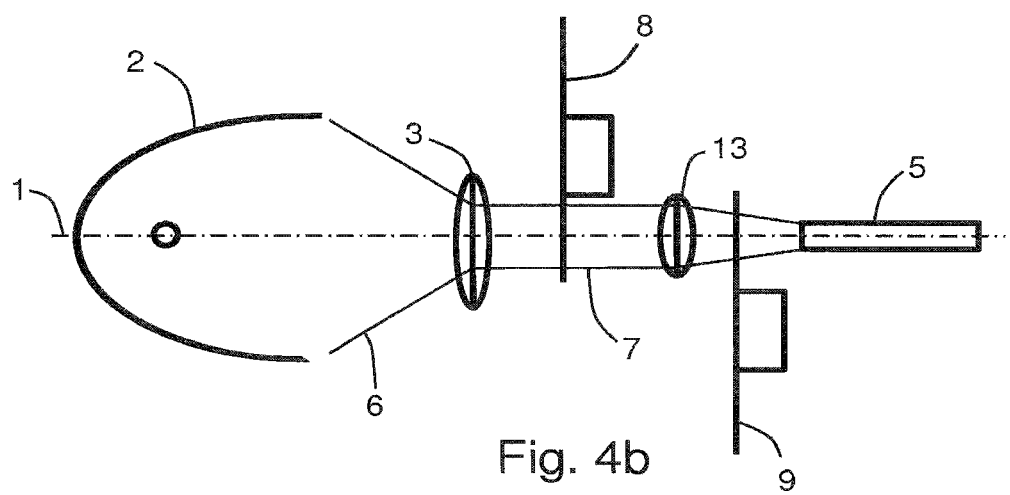

In contrast to FIG. 4*a*), the embodiment shown in FIG. 4*b*) has a lens 3 in place of the lens 12, as is described in connection with FIGS. 1 and 2. Furthermore, the color wheel 9 is arranged between the lens 13 and the light guide 5. In this embodiment, the light 6 produced by the lamp 2 is collimated by the lens 3 as in the examples from FIGS. 1 and 2, and is converted into light 7 with a parallel ray path. This light 7 passes through the filter of the two interference filters 10 and 11 of the wheel 8 that intersects the ray path of the light 7 at the time, and the filter allows light in one or more wavelength intervals of 30 nm width to pass through. The filtered light 7 is focused by the lens 13 on the end of the light guide 5; however, in this process it passes through one of the color filters of the color wheel 9 before entering the light guide 5, so that ultimately light of a specific color in a 30 nm wide wavelength range enters the light guide 5.

Figure 4C:
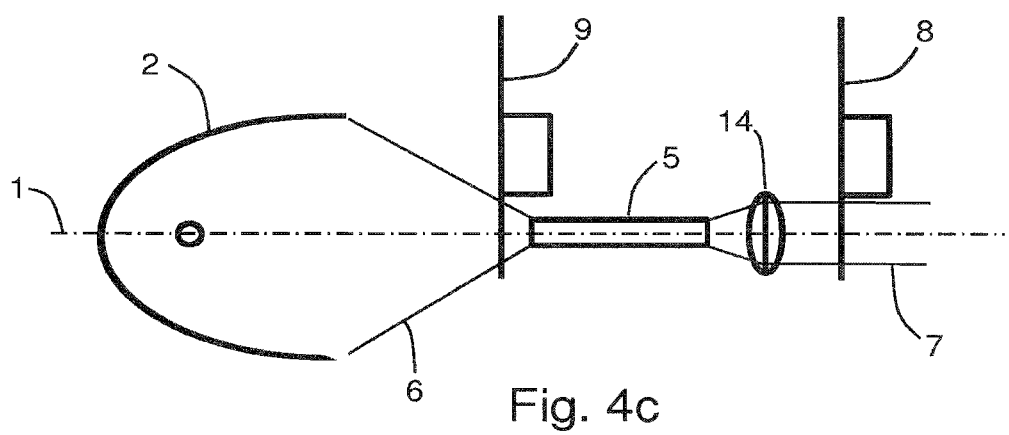

In the embodiment shown in FIG. 4*c*), the lamp 2, the color wheel 9, the light guide 5, a lens 14, and the wheel 8 with interference filters 10 and 11 are arranged in the stated order along the optical axis 1. The light guide 5 is spaced apart from the lamp 2 in such a manner that the visible light 6 produced by the lamp 2 and reflected by its parabolic reflector travels to one end of the light guide 5 and for the most part can enter the light guide 5 through this end. First, however, the light 6 passes through the color wheel 9, which allows only light of a specific color to pass, specifically light of the color corresponding to the color filter that intersects the ray path of the light 6 at the time. After entering the light guide 5, this colored light passes through the light guide 5 and exits it at its opposite end. The colored light is now converted or collimated by the lens 14 into the light beam 7 with a nearly parallel ray path, which passes through the wheel 8 and is filtered by one of its interference filters in the manner described.

Figure 4D:
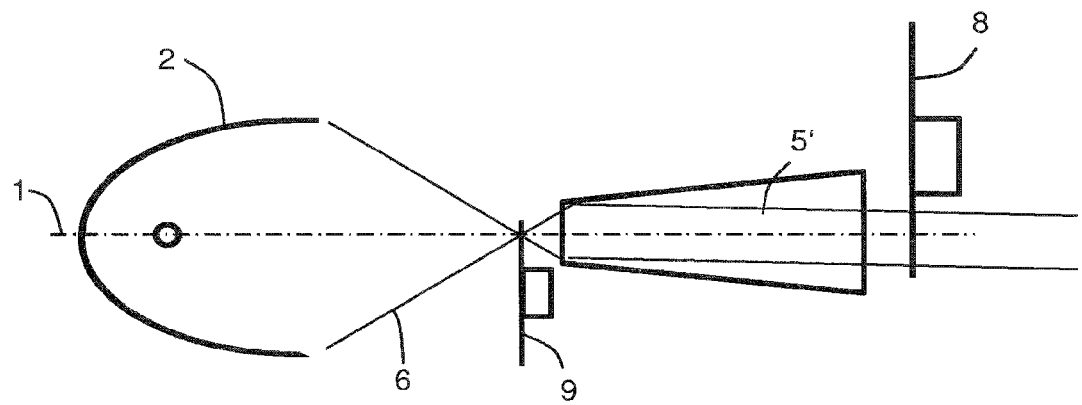

Another alternative is shown in FIG. 4*d*). In the solution shown there, the functionality of collimation as well as that of homogenization of the ray profile is accomplished by the frusto-conical light guide 5'. This variant permits an especially simple and space-saving construction.

Figure 4E:
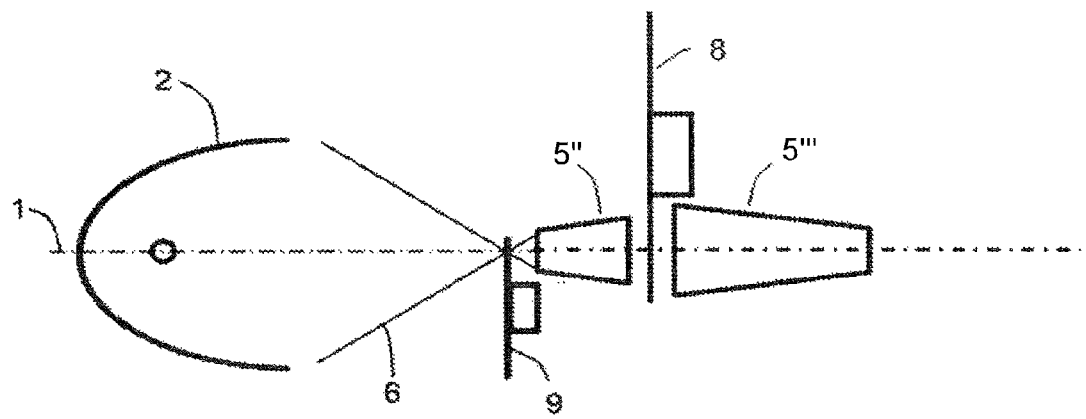

Another alternative is shown in FIG. 4*e*). In this alternative, the frusto-conical light guide 5' of FIG. 4*d*) has been changed such that two frusto-conical light guides 5" and 5''' have been formed therefrom, and these two surround the color wheel 8 with the interference filters such that the first frusto-conical light guide 5" is in front of the color wheel 8 in the ray direction and the second frusto-conical light guide 5" is behind it in the ray direction. In this design, the frusto-conical light guides 5" and 5''' are arranged such that their cross-section decreases with increasing distance from the color wheel 8 with interference filters, and they taper as a result.

Figure 4F:
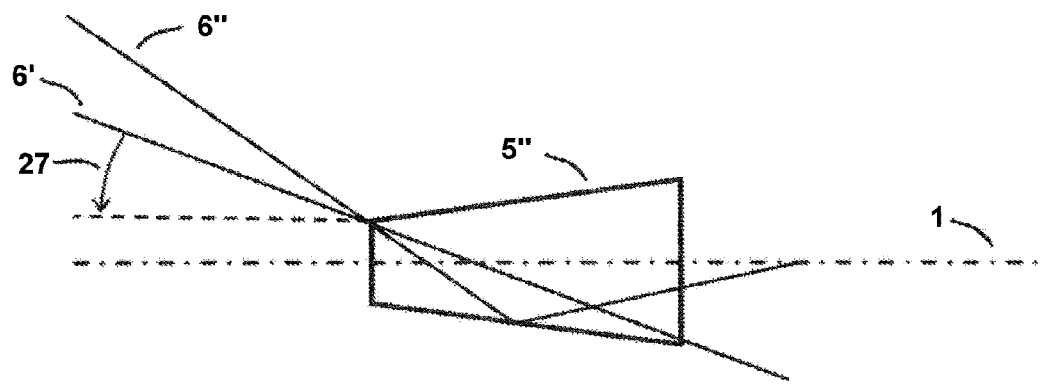

The first frusto-conical light guide 5" ahead of the color wheel ensures that light rays with large angles of incidence are reflected at least once, as is shown in FIG. 4*f*), thereby favorably influencing the angular distribution of the light when it exits in the direction of the color wheel and its interference filters as a result of the enlarged exit face. The second frusto-conical light guide 5''' collects the light that has exited the first frusto-conical light guide and passed through the color wheel, and then advantageously homogenizes it for the stereo projection device according to the invention.

It has proven especially advantageous to select the light exit face of the first frusto-conical light guide 5" ahead of the color wheel in the ray direction to be smaller than the incident light face of the second frusto-conical light guide 5''' behind the color wheel 8 in the ray direction. This ensures to a particularly great extent that the light loss upon entry to the second frusto-conical light guide 5''', and thus the light loss of the collimator consisting of the two frusto-conical light guides 5" and 5''', is especially low.

This alternative with two frusto-conical light guides 5" and 5''' is successful in keeping the overall length of the arrangement short and in this process markedly improving the quality of image reproduction.

Figure 5A:
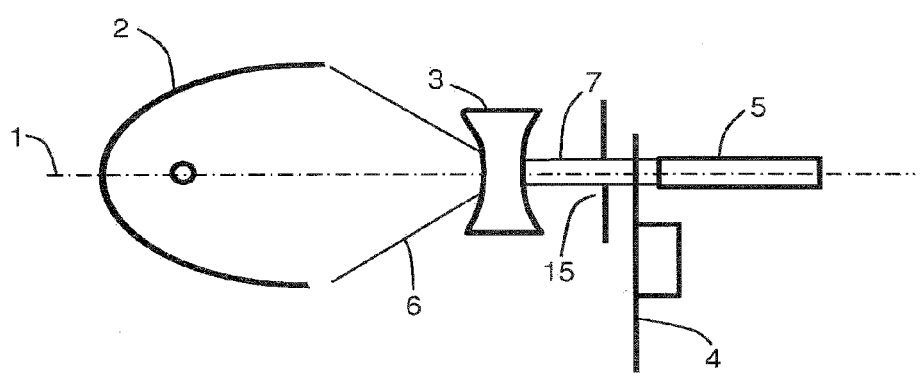
FIGS. 5a-5c illustrate various schematic representations of a portion of stereo projection devices with an aperture.

The portion of another stereo projection device according to the invention shown in FIG. 5*a*) corresponds in its construction to the embodiment depicted in FIG. 1 and described there, with the single difference that an aperture or stop 15 is provided between the lens 3 with negative focal length acting as collimator and the wheel 4. By means of this stop 15, any portions of the light beam 7 that may not be entirely parallel are kept from the interference filters of the wheel 4, improving the quality of the stereoscopic images produced by the stereo projection device still further. Alternatively, the stop can also be arranged between the lamp 2 and the lens 3, as is shown in FIG. 5*b*).

Figure 5B:
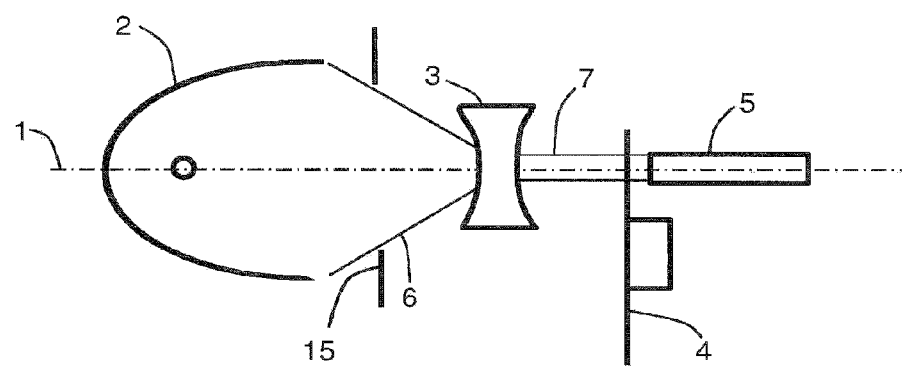

A suitable embodiment of another stereo projection device according to the invention is shown in FIG. 5*b*). This embodiment differs from the aforementioned embodiment primarily in that the aperture is now arranged in the ray path between the lamp 2 and the lens 3 with negative focal length. In this way, rays with large acceptance angles—which contribute only a small fraction of the total intensity and would necessitate elaborate additional optical elements, in particular collimator, for good projection if these rays were to be used to advantage—are masked in a directed manner. In addition to the stated collimator 15, 3, the light guide 5 is also used here as an additional collimator. The interaction of these components has specifically proven to be very advantageous.

Figure 5C:
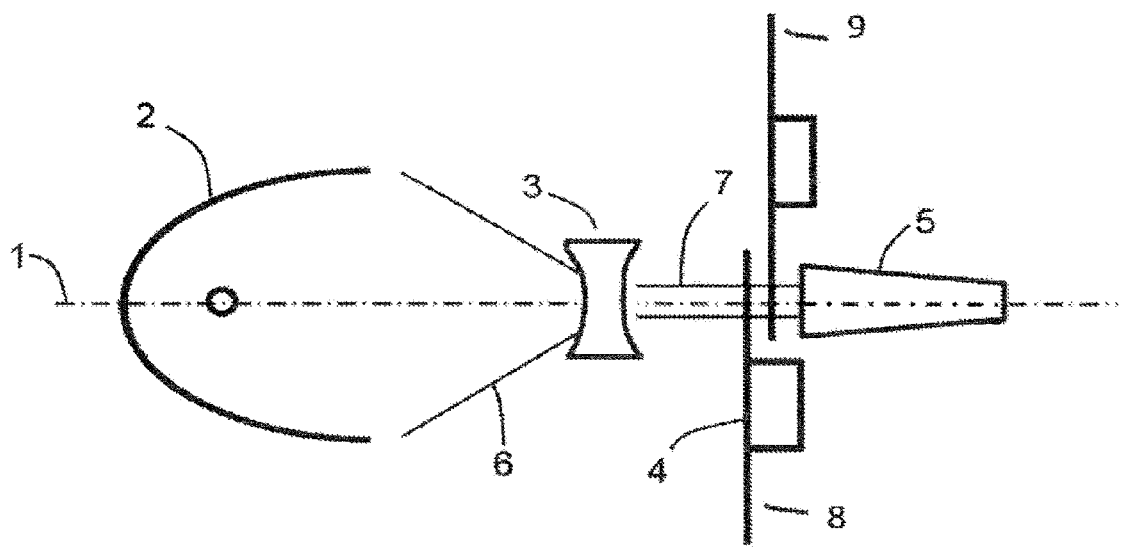

The embodiment of the stereo projection device according to the invention shown in FIG. 5*c*) has also proven successful. This embodiment, like those of FIGS. 4*a-d*), exhibits an arrangement of a wheel 8 with interference filters, and a color wheel 9 following it in the ray path. In accordance with FIGS. 5*a*) and 5*b*), the light from the lamp 2 is focused and homogenized with the aid of a lens 3 with negative focal length, and is incident first on the wheel 4, 8, and then on the wheel 9. After passing through the two wheels 4, 8, 9, the light is further homogenized by means of the frusto-conical light guide 5, and because of the orientation of the truncated cone such that the truncated cone tapers in the ray direction, the diameter of the light beam is likewise reduced. This results in a compact arrangement of the components of a stereo projection device according to the invention.

Figure 6A:
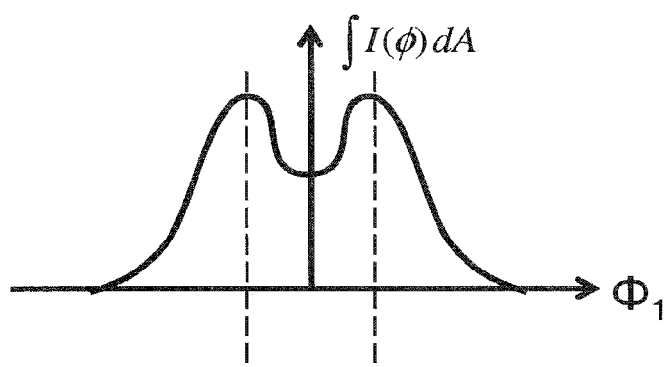
FIGS. 6a-6b illustrate intensity distributions for stops without and with collimator.

In principle, a stop 15 can also act as a collimator by itself; however, this is not preferred on account of the associated loss of intensity. FIGS. 6*a*) and 6*b*) make this clear.

Figure 6B:
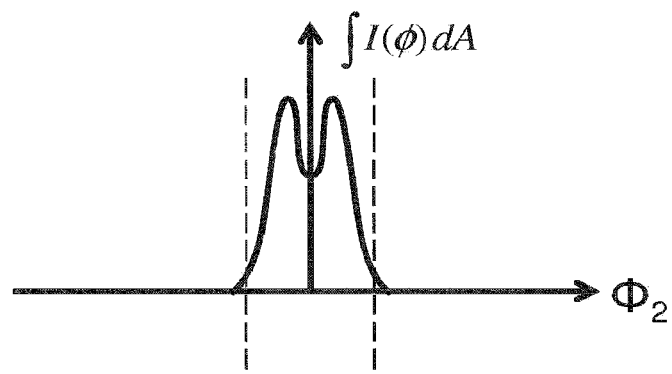

Angle-dependent light intensity is plotted in FIG. 6*a*) and FIG. 6*b*) as a surface integral over angle. In each case, the dashed lines represent the width of an exemplary stop. Only the portion of the light intensity that is located between these dashed lines can pass through the stop, while the portions located to the right and left thereof are masked. As is then evident from FIG. 6*a*), the masked portion is relatively large when the stop alone is provided as the collimator. In contrast, if the stop is combined with a lens such as the lens 3, for example, the graph is compressed due to the lens action as in FIG. 6*b*), and a much larger portion of the light passes through the stop.

As has already been shown in FIG. 4*c*), the collimator need not necessarily be located immediately after the lamp; instead, any desired number of elements can be arranged between the lamp and the collimator, and even between the collimator and the interference filter, as long as only light with a nearly parallel ray path intersects the interference filter. To this end, FIGS. 7*a*)-*c*) show, in simplified representation, examples of various stereo projection devices in which a collimator 16 and interference filters, or a wheel 4 with interference filters, are provided in different positions within the relevant stereo projection devices.

Figure 7A:
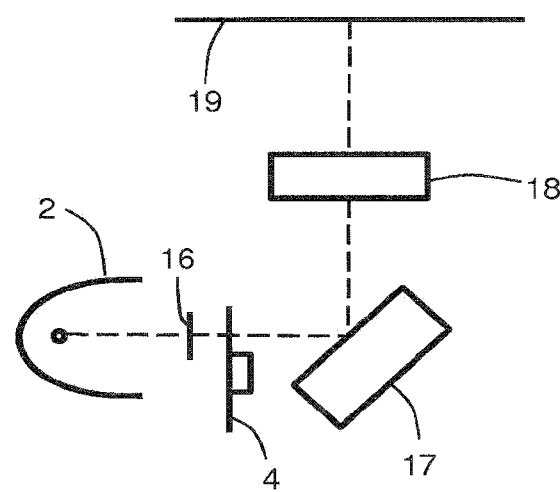
FIGS. 7a-7c illustrate stereo projection devices with variously arranged collimator and interference filters.

All stereo projection devices in FIGS. 7*a*)-*c*) include, along with the lamp 2, a known imaging system 17, a known set of projection optics 18, and a projection area 19, which are arranged in a known manner. In these devices, light produced by the lamp 2 is incident on the imaging system 17, which is preferably a DLP projector with one, two, three, or more chips. An image generated by the imaging system 17 is delivered to the projection optics 18 and is projected thereby onto the projection area 19.

Figure 7B:
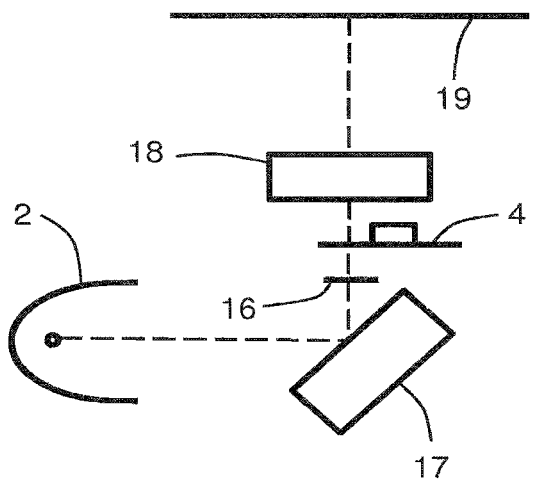
Figure 7C:
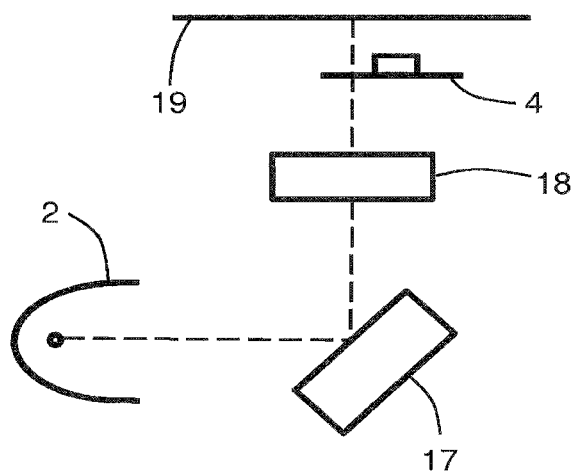

In FIG. 7*a*), the collimator 16 and the wheel 4 are now arranged between the lamp 2 and the imaging system 17. Light produced by the lamp 2 is collimated and filtered by interference filters of the wheel 4 even before it is incident on the imaging system 17. In the embodiment shown in FIG. 7*b*), the collimator 16 and the wheel 4 are arranged between the imaging system 17 and the projection optics 18, and filter the image generated by the imaging system 17. In the case of FIG. 7*c*), the wheel 4 is arranged behind the projection optics 18, and first filters the light as it is being projected by the projection optics 18 onto the projection area 19.

Figure 8:
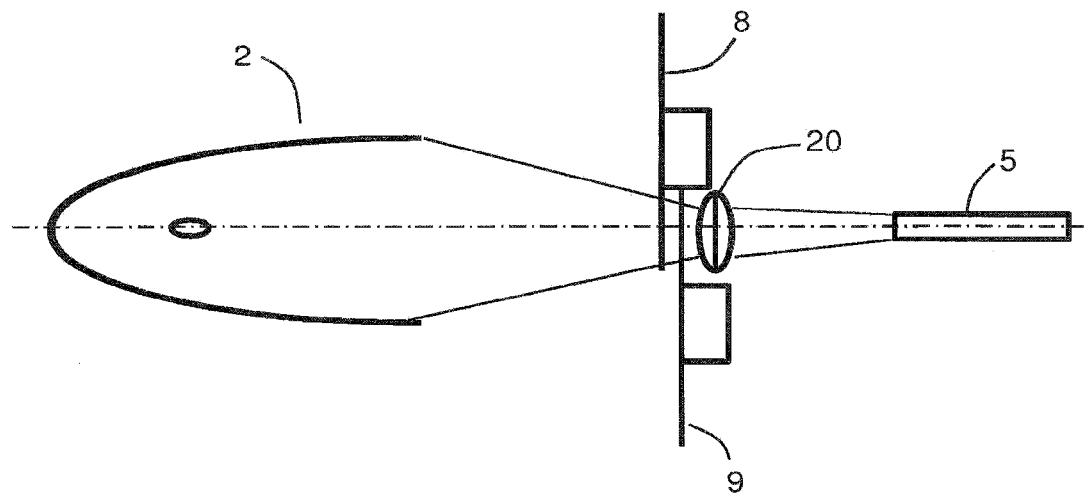
FIG. 8 illustrates another variant of the invention.

FIG. 8 shows another variant of the invention, which in particular comes into consideration as a compact retrofit solution for conventional projectors. In the solution shown in FIG. 8, the lamp 2 has a specially shaped reflector (not labeled separately), by means of which the desired collimation/parallelization is largely accomplished at the start. A further adaptation of the ray shape can be achieved by the optional lens 20, which can be arranged in the ray path after the color wheel 9 as shown, as well as ahead of it. In particular, the solution shown makes it possible to design the light guide 5 to be no longer than is required in the standard case.

If the lamp 2, the filter wheel 8, and if applicable the lens 20 form a structural unit, this unit can be implemented such that it can replace a conventional light source in a projection device. In this design, the filter wheel 8 can be pivotable out of the ray path or can be implemented or equipped with a white filter.

Figure 9A:
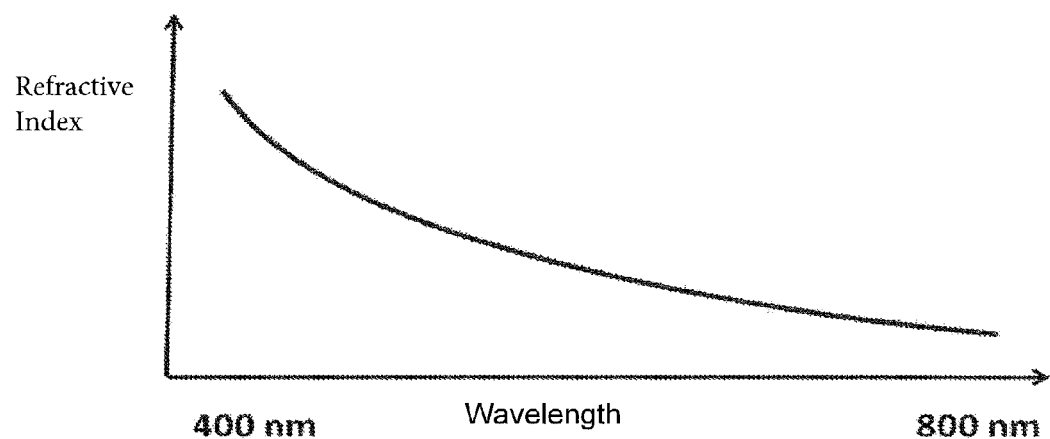
FIGS. 9a-9b shows a dispersion curve and transmission curve of an interference filter.

FIG. 9*a*) shows a typical curve of a dispersion. The refractive index decreases with increasing wavelength. This also applies to the materials used in interference filters, which as a general rule are made from two or three different materials. In this context, a high-index material, e.g., niobium oxide or tantalum oxide or titanium dioxide, and a low-index material such as silicon oxide, for example, are typically used.

Figure 9B:
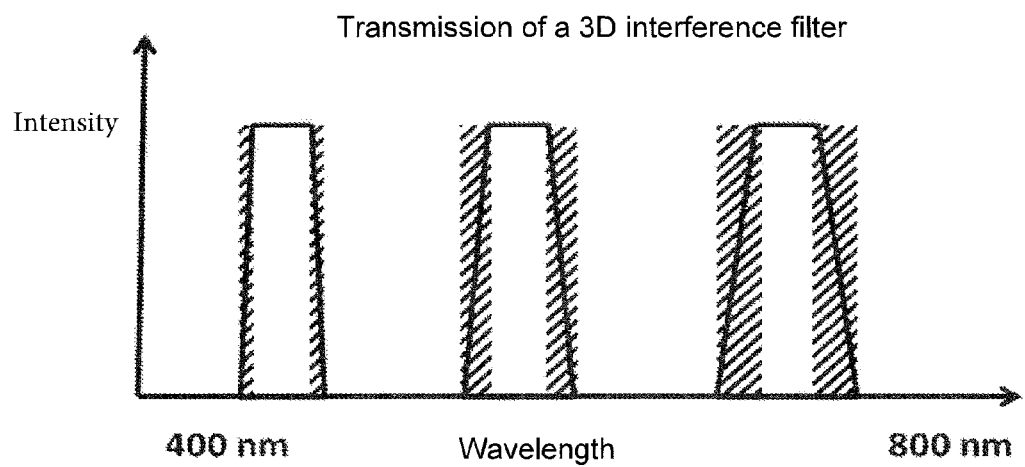

When an interference filter is illuminated with a beam of light, a broadening of the passband and a decrease in the edge steepness occur. This change in the steepness and the passband width and the wavelength displacement depends on the refractive index and scales with it. Consequently, interference filters have the highest edge steepness in the blue transmission spectrum, as is schematically shown in FIG. 9*b*). In FIG. 9*b*) the transition region of the interference filter is diagonally hatched for purposes of illustration.

Consequently, blue interference filters exhibit increased transmission in wavelength comparison relative to other, longer wavelengths. Thus, with the combination according to the invention of an interference filter with a color wheel, the switchover between the right and left single stereoscopic images is preferably placed in the blue filter or in the color transition of the blue filter of the color wheel. The advantages of this solution according to the invention are present to a particular degree specifically for short transition times, for which at least 50% of the blue segment is usable for the transition. In particular, it succeeds in at least partially compensating for the reduction in transmission of the time-shortened blue segment through interaction with the other filter wheel with interference filters.

It also proves advantageous that a transition between the two single stereoscopic images is more error-tolerant in the blue filter, as errors due to excessively short transition times or non-synchronous timing are only visible with difficulty because blue as a color contributes only a small portion to the brightness content of the image, typically in the range from 5%-10%. Because of this implementation according to the invention of the transition processes between the single stereoscopic images using a suitable synchronization unit that controls the two color wheels, very comfortable stereo image perception is achieved. It is specifically this special method of control by the synchronization unit of the stereo projection device that proves to be very advantageous, because it makes possible a simple, economical, and robust embodiment of a stereo projection device according to the invention. This produces a very suitable implementation of a stereo projection device, specifically with the construction using two color wheels in conjunction with a single-chip imaging system, be it a DLP, LCOS, or LCD imaging system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A stereo projection device comprising:
   at least one light source,
   at least one collimator for converting visible light generated by the at least one light source into light with a substantially parallel ray path, at least one interference filter that is transparent at a given angle of incidence for at least one wavelength interval each having an interval width of at most 50 nm and disposed in the substantially parallel ray path, and at least three color filters disposed on a color wheel, the color wheel disposed in the substantially parallel ray path, wherein two disjoint wavelength intervals are established for each of the at least three color filters from the visible light.

2. The stereo projection device according to claim 1, wherein the collimator has at least one aperture, at least one lens, a reflector, at least one condenser lens, at least one lens system, at least one frusto-conical light guide, at least one parabolic light guide, or at least one set of holographic optics.

3. The stereo projection device according to claims 1, wherein the interference filter is disposed on a circular segment of a rotatably mounted wheel, or in which the interference filter is arranged so as to be stationary, or in which the interference filter is electrically switchable.

4. The stereo projection device according to claim 1, wherein the color wheel has at least one transparent, achromatic filter.

5. The stereo projection device according to claim 4, wherein the color wheel has arranged thereon at least one filter for a secondary color, including yellow or cyan, in addition to the at least one transparent, achromatic filter.

6. The stereo projection device according to claim 4, wherein a synchronization unit for synchronizing the color wheel motion is provided that holds the color wheel in a position with a transparent, achromatic filter in the ray path or implements a switch between the left and right stereoscopic images synchronously with a point in time when a blue filter of the color wheel is located in the substantially parallel ray path.

7. The stereo projection device according to claim 1, further comprising: at least one lens, at least one aperture, at least one frusto-conical light guide, at least one rod-shaped light guide, or at least one parabolic light guide arranged in a ray path of light emerging from the interference filter.

8. The stereo projection device according to claim 1, wherein two frusto-conical light guides are provided, of which one is arranged downstream of the color wheel in a ray direction and one is arranged upstream of the color wheel such that a truncated cone diameters of the two frusto-conical light guides decrease with increasing distance from the color wheel.

9. The stereo projection device according to claim 8, wherein a light exit face of the frusto-conical light guide downstream of the color-wheel in the ray direction is chosen to be smaller than an incident light face of the frusto-conical light guide upstream from the wheel in the ray direction.

10. The stereo projection device according to claim 1, wherein the light source has at least one xenon lamp, or wherein the light source has at least one halogen lamp, or wherein the light source has at least one UHP lamp, or wherein the light source has at least one mercury arc lamp, or wherein the light source has at least one light-converting material, or wherein the light source has at least two individual lamps.

11. The stereo projection device according to claim 1, further comprising: at least one imaging system, wherein the at least one interference filter is arranged in the substantially parallel ray path of the light between the light source and the at least one imaging system, or having at least one imaging system and at least one set of projection optics, wherein the at least one interference filter is arranged in the substantially parallel ray path of the light between the imaging system and the at least one set of projection optics, or having at least one set of projection optics and a projection area, wherein the at least one interference filter is arranged in the substantially parallel ray path of the light between the at least one set of projection optics and the projection area.

12. The stereo projection device according to claim 1, further comprising: at least one single-chip DLP imaging system, or at least one two-chip DLP imaging system, or at least one three-chip DLP imaging system, or at least one six-chip DLP imaging system, or at least one single-chip LCOS imaging system, or at least one two-chip LCOS imaging system, or at least one three-chip LCOS imaging system, or at least one six-chip LCOS imaging system, or at least one single-chip LCD imaging system, or at least one two-chip LCD imaging system, or at least one three-chip LCD imaging system, or at least one six-chip LCD imaging system.

13. The stereo projection device according to claim 1, wherein the at least one interference filter is transparent at a given angle of incidence for at least one wavelength interval having an interval width of at most 40 nm, or at most 30 nm, or at most 20 nm, or at most 10 nm.

14. A stereo system having at least one stereo projection device according to claim 1 and comprising at least one pair of stereoscopic glasses, wherein one eyeglass lens of each of the stereoscopic glasses allows the light from one interference filter for one single stereoscopic image to pass and blocks the light from other interference filters of the stereo projection device for the other single stereoscopic image, and wherein another eyeglass lens of each of the stereoscopic glasses blocks the light from the one interference filter and allows the light from other interference filters to pass.

15. The stereo projection device according to claim 1 and at least one first pair of glasses having two first eyeglass lenses that allows the light from one interference filter for one single stereoscopic image to pass and blocks the light from other interference filters of the stereo projection device for a different single stereoscopic image, and having at least one additional, second pair of glasses with two second eyeglass lenses that blocks the light from the one interference filter of the one single stereoscopic image and allows the light from other interference filters of the stereo projection device for a different single stereoscopic image to pass.

16. The stereo projection device of claim 1, wherein at least two interference filters are disposed on segments of a rotatable disk, the rotatable disk being synchronized with rotation of the color wheel such that certain color filters are disposed in the substantially parallel ray path simultaneously with each of the at least two interference filters.

17. A method for projecting stereoscopic images or 2D images that has the following steps:
  a) Generation of visible light,
  b) Conversion of generated visible light into light having a substantially parallel ray path,
  c) Filtering of the light having the substantially parallel ray path with at least one interference filter that is transparent at a given angle of incidence for at least one wavelength interval having an interval width of at most 50 nm and that is disposed in the substantially parallel ray path, wherein the at least one interference filter is disposed on a rotatable wheel,
  d) Filtering of the light from the at least one interference filter having the substantially parallel ray path with a color wheel having at least three color filters, e) Establishing two disjoint wavelength intervals for each of the at least three color filters from the visible light based on the combination of color filter and interference filter in the substantially parallel ray path.

18. A stereo projection device comprising:
at least one light source;
at least one collimator for converting visible light generated by the at least one light source into light with a substantially parallel ray path;
at least one interference filter that is transparent at a given angle of incidence for at least one wavelength interval having an interval width of at most 50 nm and disposed in the substantially parallel ray path,
wherein the interference filter is part of a rotatably mounted wheel, or in which the interference filter is arranged so as to be stationary, or in which the interference filter is electrically switchable,
wherein the stereo projection device additionally has a color wheel; and
a synchronization unit for synchronizing color wheel motion is provided that holds the color wheel in a position with a transparent, achromatic filter in the ray path or implements a switch between left and right stereoscopic images synchronously with a point in time when the blue filter of the color wheel is located in the substantially parallel ray path.

* * * * *